INVENTORS,
WILLIAM R. BAKER JR.
DAVID A. CLUTZ
BY
Schramm, Kremer & Sturges

ATTORNEYS.

3,394,310
ELECTROSTATIC VOLTMETER EMPLOYING A SWIMMING DROPLET OF MERCURY IN AN ELECTROLYTE
William R. Baker, Jr., Nashville, Tenn., and David A. Clutz, Mercersburg, Pa., assignors to Case Institute of Technology, a corporation of Ohio
Filed Dec. 2, 1964, Ser. No. 415,427
16 Claims. (Cl. 324—93)

ABSTRACT OF THE DISCLOSURE

An electrostatic voltmeter employing a tube filled with an electrolyte and having a pair of electrodes projecting into the tube in spaced relation. A globule of mercury is disposed in the tube independent of the electrodes and the tube and moves in response to voltages applied to the electrodes. Associated with the meter are means for indicating the position of the globule in the tube relative to the electrode.

---

An object of the invention is to provide a voltmeter which may be connected to a direct-current or alternating-current system without imposing any load thereon.

Other and further objects, features and advantages of the invention will become apparent as the description proceeds.

In carrying out the invention in accordance with a preferred form thereof a tapered tube is provided with the larger diameter end higher than the smaller diameter end. The tube is filled with a viscous liquid capable of ionic or electronic conductivity and contains a mercury globule "swimming" in the liquid. The tube is preferably sealed. The liquid is chosen to have sufficient viscosity for stability and yet not so much as to require undue length of time for taking a reading. The globule comes to rest at a height representing the voltage measured and a scale may be mounted along the tube calibrated in terms of volts. For greater sensitivity the tube is tipped to a predetermined angle.

A better understanding of the invention will be afforded by the following detailed description considered in conjunction with the accompanying drawing in which.

Like reference characters are utilized throughout the drawing to designate like parts.

When an electrostatic field is applied to a mercury globule swimming in an electrolyte, the globule is subjected to differences in surface tension, which oppose the body forces on the globule such as the acceleration of gravity.

Figure 1:
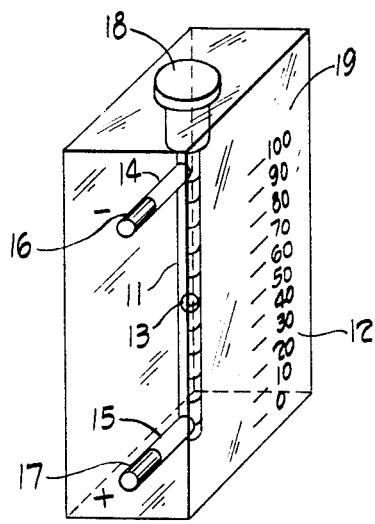
FIG. 1 is a view in perspective of an embodiment of the invention.

As shown in FIG. 1, a voltmeter in accordance with the invention comprises a tube 11 formed in a transparent block 12 of non-corrosive plastic substance such as polymethyl methacrylate, for example, such as sold under the tradenames Plexiglas, Lucite and Pontalite, a globule of mercury 13, a pair of electrodes 14 and 15 to which voltage measurement terminals 16 and 17 are connected, respectively and a suitable electrolyte in the tube 11.

Preferably the tube 11 is sealed by a suitable stopper 18 and suitable graduations 19 are placed on the side of the block 12 so that the position of the drop 13 may be calibrated in terms of values of voltage applied to the input terminals 16 and 17.

The input voltage is so connected that the lower electrode 15 is the positive electrode and the upper electrode 14 is the negative electrode. In order that adequate force will be produced by the difference in surface tension around the drop to balance the force of gravity, the bore of the tube 11 is small enough so that the drop 13 will be quite close to the tube walls. Since increasing voltage increases the upward force on the drop and increasing distance to the tube walls diminishes the upward force, a balance of forces for each different value of voltage applied to the electrodes 14 and 15 will result, with the drop in a different position in the tube if the tube is slightly tapered.

Preferably a hydrocarbon is used as the fluid for filling the tube 11. Hydrocarbons, if they conduct at all, conduct by excited delocalized electrons rather than by cation-anion conduction. A preferred fluid, polypropylene-polyethylene glycol (Pluronic L-44, Wyandotte Chemical Company) is a nonionic surfactant having a molecular weight of 1200 and a viscosity of 150 cp., which is adequate. The uncontaminated fluid gave no observable electrocapillary motion but when combined with 2% by volume $H_2SO_4$, gave an almost ideal performance with conduction mostly by ions.

No electrode reactions were observable with 70 volts applied over long time periods.

There is no apparent chemical change in fluid due to operation.

The mercury drop assumes a natural charge of opposite sign to that which would occur in an aqueous solution.

When the liquid chosen consists of polypropylene-polyethylene glycol with from 2 to 4% $H_2SO_4$ it takes about seven seconds for the mercury globule to come to rest. Gas formation is avoided by using a liquid which conducts by delocalized electrons rather than by cation-anion conduction. For example, dichlorhydrin alone $$(CH_2Cl)_2CHOH$$

may be employed. This also has one order of viscosity less than polypropylene-polyethylene glycol and therefore requires less time for the mercury globule to come to its final position, about two seconds.

The electrodes may be composed of any suitable metal such as tungsten, but for long-term stability and a reversible chemical system, platinum electrodes are preferred.

The invention is not limited to specific dimensions, however, satisfactory results have been obtained in the sample illustrated in FIG. 1 where the tube 11 is ¾ of an inch long and the mercury globule 13 has a diameter of .060″. The tube 11 has an internal diameter of approximately .065″ at the lower end and tapers outwardly toward the upper end with a taper of approximately 48 to 1. The relative voltage increases approximately linearly with a decreasing ratio of the diameter of the mercury globule to the bore of the tube. Consequently, the mercury globule 13 rises in the tapered tube until the "swimming" force balances the acceleration downward due to gravity.

Figure 2:
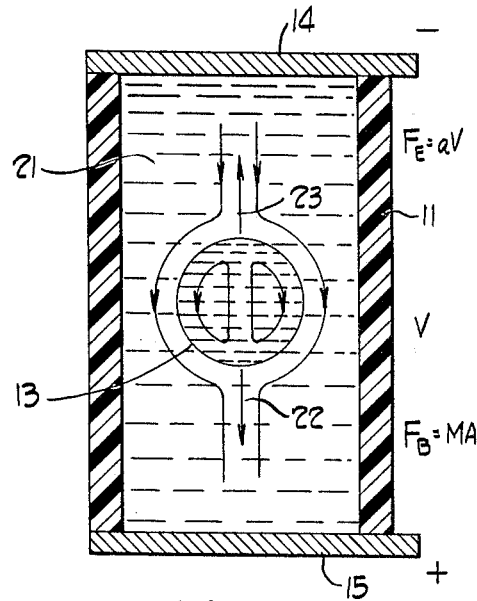
FIG. 2 is a schematic diagram illustrating the principle of operation.

This is illustrated in FIG. 2 where the arrow 22 represents the downward force resulting from the acceleration of gravity and the arrow 23 represents the upward force of electrocapillary motion resulting from the surface tension variation around the mercury drop and the flow of mercury surface coupled with the viscous electrolyte flow to produce a reaction force $F_E$ of the drop.

Figure 3:
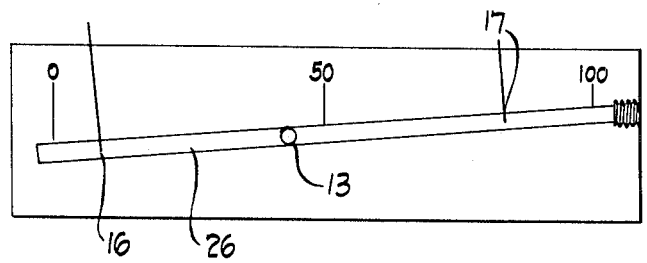
FIG. 3 is a side view of a modification of the arrangement of FIG. 1 employing a tube tilted very nearly to the horizontal.

When greater sensitivity is desired for the measurement of minute voltages, a nearly horizontal tube 26 is employed as illustrated in FIG. 3.

In this manner a very inexpensive, high-impedance voltmeter has been produced, suitable in any range from 0 to 70 volts. It has an impedance of 8 megohms for each half inch of separation between electrodes using a chlorohydrin dielectric with 2% of $H_2SO_4$.

In the device, body forces on a mercury drop, acting as seismic mass, are balanced with a surface force. The surface force is produced by a flow of the drop surface which results when a drop is placed in an electrolyte with an electric field applied across the electrolyte. The mercury drop adsorbs ions of the electrolyte on its surface, and the electric field causes a gradient in the resultant charge density in the mercury electrolyte interface. This makes the surface tension higher at one end of the drop, causing the mercury to flow on the surface from the region of low tension to the region of high tension. The flow returns through the center of the drop. The flow of the drop surface carries the electrolyte past the drop, with a resultant force of drop against electrolyte. The drop thus "swims" through the tube. The force is a direct function of the applied field voltage.

The induced flow velocities are sufficient to prevent drop contact with the tube wall except at a very low axial acceleration in the presence of high cross axial accelerations. If it is necessary to use the voltmeter under conditions where it is subjected to abrupt movements in various directions, application of an alternating current electric field will produce enough flow to restore drop wall lubrication, without producing gross axial motion of the drop.

Since the mercury drop or globule and the electrolyte are immiscible, there is an interface at which there appears an electrical double layer which may consist of a layer of electrons, a layer of adsorbed ions, and a diffuse layer (an ionic atmosphere in which ions of one sign are in excess, whereas those of the opposite sign are depleted). This diffuse layer is seldom over 100 angstroms thick in the case of normal concentration of solutions. The double layer may also contain neutral bipolar molecules which exert an influence on the thermodynamics of the interface.

The mercury drop is sheathed by the double layer and the net convection of all charges appearing on the surface is zero under ideal conditions. If the charges do not continue to cross the double layer, a polarized capacitance is maintained around the drop and it appears as a dielectric mass to the surrounding fluid under ideal conditions. Experimentally, a polarized interface is an electrode which behaves like an electrical condenser without leakage. This being the case, the natural charge arising in a double layer, as the drop is placed in the electrolyte, is many times greater than the charge it could be given by electrostatic means.

If the drop is placed in a slightly conducting fluid and no neutral charges are adsorbed in its double layer, a natural potential and a charge density will build up in the double layer. If an electrical field is applied to the surrounding fluid, it is found that the potential across the double layer will now vary in the direction of the field. A consequence is a variable charge density in the double layer following the characteristics of the electrocapillary curve. The distribution of the density of the lines of forces in the double layer corresponds to the interfacial tension and uniquely to the adsorbed components.

If the drop were solid, the variation of tangential forces from the top to the bottom of the drop would result in strains inside the drop, but a different result is obtained for a liquid metal. The surface forces bring the surface of the liquid into motion. They flow from the area of high charge density to that of low charge density and they are relatively high in magnitude. Thus there is a tendency for the liquid at the center of the drop to flow up and for that at the surfaces to flow down causing the drop in effect to "swim" upward opposing the force of gravity.

A summary of operation of the device is as follows. A drop of mercury is placed in an electrolyte solution in a tapering tube with electrodes at either end. An electric potential placed across the electrodes produces a surface tension variation around the mercury drop. The resultant flow of the mercury surface couples with the viscous electrolyte flow to produce a reaction force $F_E$ on the drop (FIGURE 2), such that $F_E = aV$, where $a$ is a constant and V is voltage between electrodes. An acceleration along the tube axis produces the body force $F_B$ on the drop.

The operation of the device is primarily determined by the mercury-electrolyte system. The mercury-electrolyte system performs four functions. It converts the input acceleration to a body force $F_B$, converts the electrode voltage V to an electrocapillary force $F_E$, compares the magnitude of each, and causes the globule of mercury to drift up or down until the forces are in balance. The first force is expressed by the simple relation $F_B = M \times A$ where M is the mass of the globule and A its acceleration. The second is given by $F_E = a \times V$ where $a$ is the electrocapillary force constant.

The dependence of the electrocapillary force constant $a$ on the various electrochemical system parameters has been found to be represented by the equation $$F_B = \frac{be_0 E_0}{\left[1 + \frac{m'}{m}\right]} = \frac{be_0 V}{\left[1 + \frac{m'}{m}\right] L}$$

where $E_0$ is the electrical field in the electrolyte produced by the voltage V across the two electrodes separated by a distance L. The natural charge on the drop $e_0$ is a result of the electrical double layer between the drop and the electrolyte. The ratio of the viscosity of the mercury to that of the electrolyte is given by $m'/m$. The wall factor $b$ is a constant which takes into account the effect of the nearness of the tube wall to the drop on the electric field and viscous flow coupling between the drop surface and electrolyte. The electrocapillary force constant $a$ is then dependent on the natural drop charge $e_0$, the viscosity ratio $m'/m$ and the wall factor $b$. The viscosity of the electrolyte is normally adjusted such that $$\left[1 + \frac{m'}{m}\right]$$

approaches unity. The natural drop charge $e_0$ depends upon the chemical nature of the electrolyte. The wall factor $b$ is a direct function of the ratio of drop radius to tube radius.

As stated, the wall factor takes into account the viscous coupling between the drop surface and the electrolyte. It is primarily a geometrical factor, dependent upon the ratio of drop radius to tube radius, but also allows for any change in viscous coupling due to temperature variations. It has been demonstrated that over a temperature range from 30° F. to 107° F., there is no detectable variation in coupling so that the wall factor $b$ may be considered merely a geometrical parameter fixed by the selection of drop size and tube diameter. It is then constant over a long term if the tube is dimensionally stable. Any perturbation or drift in the value of $a$ is thus due to variations in the natural charge of the drop $e_0$.

The above account assumes a sealed electrochemical system and an electrolyte-electrode system which is completely reversible. In such a system, the overall chemical balance is maintained. With the use of such a chemical system, any changes in $e_0$ must be due to local variations in the ionic concentration in the electrolyte surrounding the drop. To summarize, the long term stability of calibration of the voltmeter is dependent upon maintaining a reversible chemical system with a constant ionic distribution within the system.

Accordingly, the electrolyte employed is one which provides sufficient electrical conductivity to establish the electrical double layer on the mercury surface but which will not dissociate (break down chemically) in such a way that recombination cannot take place. Any irreversible action usually takes the form of gas bubble formation on the electrodes, or the formation of a non-conducting film on the electrode surface. Neither the bubbles nor the film go back into solution on the reversal of current, so such action is called irreversible. Although a perfectly reversible electrocapillary system depends upon use of an electrolyte with the desired properties, tests have indicated satisfactory results from the use of either polypropylene-polyethylene glycol sold under the tradename Pluronic L-44 liquid with 2% $H_2SO_4$, freed from moisture, and platinum electrodes or use of an electrolyte known as dichlorhydrin $(CH_2Cl)_2CHOH$ with 2% by volume of sulfuric acid $H_2SO_4$.

Figure 4:
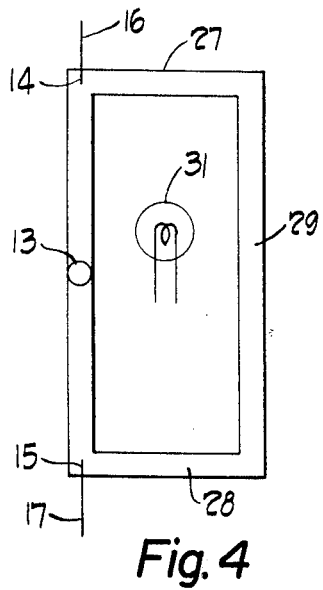
FIG. 4 is a diagram of another embodiment of the invention.

If the apparatus is employed in operation over an extended period with voltage continuously applied, the polypropylene-polyethylene glycol which has not reacted with the sulfuric acid may become concentrated at the lower or positive end of the tube so that the reaction product is concentrated at the upper or negative electrode. The drop then falls in the tapered tube toward the region of pure polypropylene-polyethylene glycol in about 12 hours. For such continuous operation therefore a provision is made to recirculate the fluid. This may be done by a closed loop tube such as illustrated in FIG. 4. Branch tubes 27 and 28 are connected to the upper and lower ends of the tube 11 joined by a return tube 29. The thermosiphon effect of a slight increase in temperature by the application of voltage to the tube 11 causes the requisite circulation of fluid. FIG. 4 also illustrates the location of the lamp 31 for facilitating observation of the location of the mercury globule 13 and reading scale gradations.

Certain embodiments of the invention and certain methods of operation embraced therein have been shown and particularly described for the purpose of explaining the principle of operation of the invention and showing its application, but it will be obvious to those skilled in the art that many modfiications and variations are possible, and it is intended therefore to cover all such modifications and variations as fall within the scope of the invention.

What is claimed is:

1. A voltmeter comprising in combination a slightly tapered tube filled with electrolyte, means for mounting the tube with a larger diameter end higher than a smaller diameter end, spaced electrodes projecting into the tube with means for applying to the electrodes a voltage to be measured, a globule disposed freely within the tube independent of the electrodes and tube composed of a substance capable of carrying an electrostatic charge, the globule moving towards the larger diameter end of the tube in response to voltages applied to the electrodes and means indicative of the position of the globule in the tube, relative to the electrodes and said electrolyte being non-reactive with the globule disposed in the tube.

2. The article called for in claim 1 in which the globule is composed of mercury.

3. The article called for in claim 2 wherein the globule has a diameter closely approaching that of the tube at the smaller diameter end thereof.

4. The article called for in claim 2 wherein the electrolyte comprises polypropylene-polyethylene glycol having a molecular weight of about 1200 with between 2 and 4% sulfuric acid therein.

5. The article called for in claim 2 wherein the electrolyte comprises dichlorhydrin $[(CH_2Cl)_2CHOH]$.

6. The article called for in claim 1 wherein the electrolyte and the electrodes are composed of substances forming a sealed electrochemical system which is substantially reversible with a constant ionic distribution within the system.

7. The article called for in claim 1 wherein the electrolyte-electrode system will provide sufficient electrical conductivity to establish an electrical double layer on the surface of the globule but will not dissociate substantially in such a way that recombination cannot take place.

8. The article called for in claim 1 wherein the globule is composed of mercury and the tube is provided with slight recesses containing platinum electrodes and the tube is tightly sealed.

9. The article called for in claim 1 wherein the tube is composed of an acrylic plastic.

10. The article called for in claim 9 in which the tube is composed of polymerized methyl methacrylate.

11. The article called for in claim 1 in which the tube has a longitudinal axis forming a relatively small angle with the horizontal.

12. The article called for in claim 1 in which the tube has a taper of 48 to 1.

13. A voltmeter comprising in combination a slightly tapered tube filled with electrolyte, means for mounting the tube with the larger diameter end higher than a smaller diameter end, spaced electrodes projecting into the tube with means for applying to the electrodes the voltage to be measured, a globule disposed freely within the tube independent of the electrodes and tube composed of a substance capable of carrying an electrostatic charge, the globule moving towards the larger diameter end of the tube in response to voltages applied to the electrodes, means indicative of the position of the globule in the tube relative to the electrodes, a branch tubing also filled with the electrolyte connected to the upper and lower ends of said tube and providing a circulation path between the upper and lower ends of the tube, and said electrolyte being non-reactive with the globule disposed in the tube and having a relatively large viscosity in comparison with the viscosity of the globule.

14. A voltmeter as called for in claim 1 in which the electrolyte is a substance having a relatively large viscosity in comparison wtih the viscosity of the globule.

15. A voltmeter as in claim 1 wherein the electrodes are composed of platinum and the electrolyte comprises polypropylene-polyethylene glycol with 2% by volume of $H_2SO_4$.

16. Apparatus as in claim 15 wherein the electrolyte has been substantially freed from moisture.

References Cited

UNITED STATES PATENTS

| | | | |
|---|---|---|---|
| 1,586,714 | 6/1926 | Slepian | 324—92 |
| 2,343,885 | 3/1944 | Coleman | 324—31 |
| 2,851,618 | 9/1958 | Krawinkel | 324—109 XR |
| 2,946,954 | 7/1960 | Fitch | 324—93 XR |

RUDOLPH V. ROLINEC, *Primary Examiner.*

E. F. KARLSEN, *Assistant Examiner.*